(12) United States Patent
De La Rosa et al.

(10) Patent No.: US 10,302,339 B2
(45) Date of Patent: May 28, 2019

(54) REFRIGERATION APPLIANCE WITH A HEAT EXCHANGING ELEMENT

(71) Applicant: BSH HAUSGERAETE GMBH, Munich (DE)

(72) Inventors: Oscar De La Rosa, Ulm (DE); Niels Liengaard, Ulm (DE); Sascha Steininger, Oberkochen (DE)

(73) Assignee: BSH Hausgeraete GmbH, Munich (DE)

( * ) Notice: Subject to any disclaimer, the term of this patent is extended or adjusted under 35 U.S.C. 154(b) by 40 days.

(21) Appl. No.: 15/521,346

(22) PCT Filed: Oct. 21, 2015

(86) PCT No.: PCT/EP2015/074340
§ 371 (c)(1),
(2) Date: Apr. 24, 2017

(87) PCT Pub. No.: WO2016/066489
PCT Pub. Date: May 6, 2016

(65) Prior Publication Data
US 2017/0307265 A1 Oct. 26, 2017

(30) Foreign Application Priority Data
Oct. 29, 2014 (DE) .................. 10 2014 222 108

(51) Int. Cl.
*F25D 21/10* (2006.01)
*F25B 30/06* (2006.01)
(Continued)

(52) U.S. Cl.
CPC .............. *F25B 30/06* (2013.01); *F24T 10/30* (2018.05); *F25B 39/04* (2013.01); *F25D 21/04* (2013.01);
(Continued)

(58) Field of Classification Search
CPC ........ F28D 1/02; F28D 15/0266; F28F 1/022; F28F 13/06; F28F 13/00; F25B 4/00;
(Continued)

(56) References Cited

U.S. PATENT DOCUMENTS 3,854,302 A * 12/1974 Masuda .................. F25D 21/10
62/282
5,826,442 A * 10/1998 Lee ........................ F25D 17/065
62/283
(Continued)

FOREIGN PATENT DOCUMENTS

DE 102011082791 A1 3/2013
DE 102012020928 A1 4/2014
(Continued)

*Primary Examiner* — Emmanuel Duke
(74) *Attorney, Agent, or Firm* — Laurence A. Greenberg; Werner H. Stemer; Ralph E. Locher

(57) ABSTRACT

A refrigeration appliance includes a refrigeration circuit having a condenser and a heat circulation system for heating an element of the refrigeration appliance. The heat circulation system includes a heat conducting region. A heat exchanging element includes the condenser and the heat conducting region. The condenser and the heat conducting region in the heat exchanger element are thermally coupled in order to output heat from the refrigeration circuit to the heat conducting region of the heat circulation system.

15 Claims, 7 Drawing Sheets

(51) Int. Cl.
  *F25B 39/04*  (2006.01)
  *F25D 21/12*  (2006.01)
  *F25D 21/14*  (2006.01)
  *F25D 21/04*  (2006.01)
  *F25D 23/12*  (2006.01)
  *F28F 13/06*  (2006.01)
  *F24T 10/30*  (2018.01)
  *F25B 13/00*  (2006.01)
  *F25B 23/00*  (2006.01)
  *F28F 13/00*  (2006.01)

(52) U.S. Cl.
  CPC .............. *F25D 21/12* (2013.01); *F25D 21/14* (2013.01); *F25D 23/12* (2013.01); *F28F 13/06* (2013.01); *F25B 13/00* (2013.01); *F25B 23/00* (2013.01); *F25D 2321/1412* (2013.01); *F28F 13/00* (2013.01); *Y02E 10/10* (2013.01)

(58) Field of Classification Search
  CPC .......... F25B 30/06; F25B 39/04; F25B 23/00; F24T 10/30; F25D 23/12; F25D 21/04; F25D 21/14; F25D 21/12; F25D 2321/1412; Y02E 10/16
  See application file for complete search history.

(56) References Cited

U.S. PATENT DOCUMENTS

| | | | |
|---|---|---|---|
| 6,101,835 A * | 8/2000 | Butsch ................ | B67D 1/0864 |
| | | | 222/146.1 |
| 2015/0013354 A1* | 1/2015 | Ramirez ............... | F25D 21/006 |
| | | | 62/81 |
| 2015/0300699 A1* | 10/2015 | Styles .................... | F25B 30/02 |
| | | | 62/498 |

FOREIGN PATENT DOCUMENTS

| | | | | |
|---|---|---|---|---|
| EP | 2735819 A2 * | 5/2014 | .............. | F25B 13/00 |
| WO | 2013145702 A1 | 10/2013 | | |
| WO | 2014072743 A1 | 5/2014 | | |
| WO | WO 201413721 A1 * | 9/2014 | ................ | F28F 9/04 |

* cited by examiner

REFRIGERATION APPLIANCE WITH A HEAT EXCHANGING ELEMENT

BACKGROUND OF THE INVENTION

Field of the Invention

The present invention relates to a refrigeration appliance with a heat exchanging element.

During the operation of a refrigeration appliance the interior or the refrigeration appliance is cooled by a refrigeration circuit. During cooling the temperature in the interior of the refrigeration appliance is reduced by the expenditure of mechanical work by parts of the refrigeration circuit. This causes heat to be produced at certain points in the refrigeration circuit, said heat having to be efficiently dissipated in order to ensure an advantageous degree of efficiency in the refrigeration circuit and in order to ensure advantageous cooling of the refrigeration appliance.

SUMMARY OF THE INVENTION

It is the object of the present invention to specify a refrigeration appliance, in which heat can be dissipated efficiently from the refrigeration circuit.

Said object is achieved by subject matter with the features set out in the independent claim. Advantageous embodiments are the subject matter of the dependent claims, the description and the drawings.

According to one aspect the inventive object is achieved by a refrigeration appliance with a refrigeration circuit with a condenser, with a heat circulation system for heating an element of the refrigeration appliance, the heat circulation system comprising a heat conducting region, and with a heat exchanging element, which comprises the condenser and the heat conducting region, the condenser and the heat conducting region in the heat exchanging element being thermally coupled in order to output heat from the refrigeration circuit to the heat conducting region of the heat circulation system.

This has the technical advantage that the thermal coupling of the condenser of the refrigeration circuit to the heat conducting region of the heat circulation system in the heat exchanging element means that heat is transferred efficiently from the refrigeration circuit to the heat conducting region of the heat circulation system and the heat can be absorbed for example by a heat transporting substance in the heat circulation system. The transferred heat can be transported by the heat circulation system, for example a thermosiphon or heating pipe, for example by a heat transporting substance, to an element of the refrigeration appliance and be output to the element to heat said element.

An element of the refrigeration appliance can be a region or part of the refrigeration appliance, which is not actively cooled by the refrigeration circuit of the refrigeration appliance and which is to be heated. The element can comprise for example the refrigeration appliance door, the frame of the refrigeration appliance, a surface region of the frame of the refrigeration appliance, a power supply unit or an evaporation tray of the refrigeration appliance.

In order for the refrigerant to condense in the refrigeration circuit during the condensation process, a quantity of heat is output by the condenser. The quantity of heat output by the condenser is transferred to the heat conducting region of the heat circulation system in the heat exchanging element as a result of thermal coupling. Thermal coupling can be brought about by means of a thermally conducting element of the heat exchanging element, for example a thermally conducting metal element arranged between the condenser and the heat conducting region.

The quantity of heat transferred to the heat conducting region can be output for example to a heat transporting substance of the heat circulation system that is present and can absorb the heat in the heat conducting region. The heat circulation system is configured to transport the absorbed heat to an element of the refrigeration appliance where heat is required and to output the absorbed quantity of heat to said element of the refrigeration appliance.

This means inter alia that the heat produced during the cooling process is not output unused to the surroundings; rather the heat produced can be used to heat elements of the refrigeration appliance that require heat. Also the use of the heat circulation system to dissipate heat from the condenser means that the condenser is cooled efficiently, thereby allowing a low condensation temperature to be achieved for the refrigerant in the refrigeration circuit. The lower the condensation temperature of the refrigerant, the greater the efficiency of the compressor in the refrigeration circuit and the lower the overall energy consumption of the refrigeration appliance. The heat exchanging element therefore allows efficient dissipation of heat from the condenser.

A refrigeration appliance refers in particular to a domestic refrigeration appliance, in other words a refrigeration appliance used for domestic management in a domestic or catering context and serving in particular to store food and/or beverages at defined temperatures, for example a refrigerator, freezer cabinet, combined refrigerator/freezer, chest freezer or wine chiller cabinet.

In one advantageous embodiment of the refrigeration appliance the heat exchanging element comprises a condenser made of multiport extruded tube.

This has the technical advantage that the use of a condenser made of multiport extruded tube (MPE condenser) allows a particularly efficient transfer of heat from the condenser to the heat conducting region of the heat circuit.

An MPE condenser has a large internal surface, thereby allowing an efficient transfer of heat from the refrigerant to the surface of the MPE condenser. If there is a thermally conducting contact present between the surface of the MPE condenser and the heat conducting region of the heat circulation system, for example by means of a thermally conducting metal connection, heat can be transferred efficiently from the MPE condenser to the heat circulation system.

In a further advantageous embodiment of the refrigeration appliance the condenser comprises a refrigeration duct and the heat conducting region comprises a heat duct, the refrigeration duct being configured to convey a refrigerant from the refrigeration circuit in the heat exchanging element and the heat duct being configured to convey a heat transporting substance from the heat circulation system in the heat exchanging element.

This has the technical advantage that the refrigeration duct of the condenser and the heat duct of the heat conducting region allow the constant conveying of refrigerant or heat transporting substance in the refrigeration appliance. Also the arrangement of the refrigeration duct of the condenser and the heat duct of the heat conducting region in the heat exchanging element means there is spatial proximity between the refrigeration circuit and the heat circulation system. Thermal coupling between the refrigerant in the refrigeration circuit duct and the heat transporting substance in the heat duct is established in the heat exchanging element, thereby allowing an efficient transfer of heat from the refrigerant to the heat transporting substance.

In a further advantageous embodiment of the refrigeration appliance the refrigeration duct and the heat duct are arranged parallel to one another, it being possible for the refrigerant that can be conveyed in the refrigeration duct and the heat transporting substance that can be conveyed in the heat duct to be conveyed in opposing flow directions through the refrigeration duct and through the heat duct.

This has the technical advantage that the parallel arrangement of refrigeration duct and heat duct allows an efficient transfer of heat from the refrigeration circuit to the heat circulation system. The opposing flow directions of the refrigerant in the refrigeration duct and the heat transporting substance in the heat duct allow an efficient transfer of heat between the two circuits, with the result that the temperature difference between the condenser and the heat conducting region is kept small. This allows a constant transfer of heat between the two circuits during the heat exchange process.

In a further advantageous embodiment of the refrigeration appliance the refrigeration duct is separated from the heat duct by a thermally conducting separating wall.

This has the technical advantage that the separating wall between refrigeration duct and heat duct ensures strict separation between the two ducts so there is no physical exchange of refrigerant and heat transporting substance. As the separating wall is thermally conducting and made for example of a metal such as aluminum, there can still be an efficient flow of heat from the refrigerant to the heat transporting substance through the separating wall in order to ensure an advantageous exchange of heat in the heat exchanging element.

In a further advantageous embodiment of the refrigeration appliance the heat exchanging element comprises a top unit, the top unit being configured to connect the heat exchanging element to the refrigeration circuit and to the heat circulation system, the refrigeration circuit comprising a refrigerant and the heat circulation system comprising a heat transporting substance.

This has the technical advantage that the dual function of the top unit in connecting both the refrigeration circuit and the heat circulation system to the heat exchanging element allows an efficient exchange of heat between the two circuits. In particular the refrigerant of the refrigeration circuit can be introduced into the heat exchanging element through the top unit in a first position of the heat exchanging element and can be conducted out of the heat exchanging element in a second position of the heat exchanging element.

The top unit can be configured in such a manner that the refrigerant of the refrigeration circuit is introduced into the heat exchanging element through the top unit in a first position of the heat exchanging element and the refrigerant is conducted out of the heat exchanging element to another top unit in a further position of the heat exchanging element. Heat transporting substance can then be introduced into the heat exchanging element from the heat circulation system through the top unit in a second position of the heat exchanging element.

In a further advantageous embodiment of the refrigeration appliance the top unit comprises a refrigerant chamber for receiving the refrigerant through a first opening and a substance chamber for receiving the heat transporting substance through a second opening, the refrigerant chamber and the substance chamber being separated from one another by a thermally conducting center web.

This has the technical advantage that the top unit is suitable both for supplying the refrigerant from the refrigeration circuit and for supplying the heat transporting substance from the heat circulation system, resulting in an efficient transfer of heat between the circuits. Refrigerant can be conducted through the first opening of the top unit unto the refrigerant chamber of the top unit to then be supplied to the heat exchanging element. Heat transporting substance can be conducted through the second opening of the top unit into the substance chamber of the top unit to then be supplied to the heat exchanging element. The center web separates the refrigerant chamber and substance chamber in the top unit, thereby preventing the refrigerant and heat transporting substance from mixing. As the center web is thermally conducting and made of aluminum for example, it still ensures that heat can be conducted efficiently from the refrigerant in the refrigerant chamber to the heat transporting substance in the substance chamber of the top unit.

In a further advantageous embodiment of the refrigeration appliance the heat transporting substance comprises an alkane, a fluorinated hydrocarbon or water, preferably isobutane, tetrafluoroethane or water, and particularly preferably water.

This has the technical advantage that said substances ensure efficient heat transportation in the heat circulation system.

In a further advantageous embodiment of the refrigeration appliance the heat circulation system contains a heat transporting substance and comprises a heat output region, the heat conducting region being configured to output the quantity of heat absorbed by the condenser of the heat exchanging element to the heat transporting substance in the heat circulation system in order to heat the heat transporting substance, the heat circulation system being configured to conduct the heated heat transporting substance from the heat conducting region to the heat output region and the heat output region being configured to output the quantity of heat absorbed by the heat transporting substance to the element of the refrigeration appliance.

This has the technical advantage that the arrangement of the heat circulation system, for example a thermosiphon or heating pipe, ensures efficient heat absorption in the heat conducting region, efficient transportation of the absorbed heat to the heat output region and efficient outputting of the absorbed heat to the element of the refrigeration appliance.

In a further advantageous embodiment of the refrigeration appliance the refrigeration circuit comprises an active system with an evaporator, a compressor or a throttle device.

This has the technical advantage that the use of an active system with the abovementioned parts allows an efficient refrigeration circuit to be brought about, with at least one of the abovementioned parts being actively operated by electrical energy, producing heat which is output to the heat circulation system.

In a further advantageous embodiment of the refrigeration appliance the heat circulation system comprises a passive system with a thermosiphon or a heating pipe.

This has the technical advantage that the use of a passive system allows an efficient heat circulation system to be brought about, which can be operated solely by a temperature gradient outside the heat circulation system and is not reliant on the supply of electrical or mechanical energy from outside the heat circulation system.

In a further advantageous embodiment of the refrigeration appliance the refrigeration appliance comprises an evaporation tray, the heat circulation system being configured to output the absorbed quantity of heat to the evaporation tray of the refrigeration appliance.

This has the technical advantage that by coupling a heat circulation system, for example a thermosiphon or heating pipe, to the evaporation tray of the refrigeration appliance it is possible to heat the evaporation tray efficiently. The evaporation tray receives condensation water from the refrigeration appliance that results when the evaporator of the refrigeration appliance condenses water from the ambient air during operation of the refrigeration appliance. Heating the evaporation tray accelerates the evaporation of condensation water in the evaporation tray. Also the heat from the heat circulation system dissipated through the heat circulation system to the evaporation tray can lower the condensation temperature of the refrigerant in the refrigeration circuit, which increases the efficiency of the refrigeration appliance and reduces the energy consumption of the refrigeration appliance.

In a further advantageous embodiment of the refrigeration appliance the heat circulation system comprises a heat output region, the heat output region comprising a thermally conducting element, which is in thermal contact with the evaporation tray, in order to ensure efficient heating of the evaporation tray.

This has the technical advantage that contact between the heat output region and a thermally conducting element, for example a surface-enlarging element such as fins, allows particularly efficient outputting of heat from the heat output region to the evaporation tray.

In a further advantageous embodiment of the refrigeration appliance the heat circulation system is configured to output the absorbed quantity of heat to the frame of the refrigeration appliance.

This has the technical advantage that the outputting of heat to the frame allows efficient heating of the outer region of the refrigeration appliance with the refrigerant in the refrigeration circuit being cooled efficiently at the same time.

In a further advantageous embodiment of the refrigeration appliance the heat circulation system is configured to output the absorbed quantity of heat to a surface region of the frame of the refrigeration appliance.

This has the technical advantage that by outputting heat to the surface region of the frame it is possible to prevent water from the ambient air condensing in the refrigeration appliance. The surface region of the frame is located near to the refrigeration appliance door. When the refrigeration appliance door is opened, moist air can come into contact with the surface region of the frame, which can cause water to condense on the surface region, which is not desirable. It is possible to reduce or prevent the water condensation by heating the surface region of the frame.

BRIEF DESCRIPTION OF THE SEVERAL VIEWS OF THE DRAWING

Further exemplary embodiments are described with reference to the accompanying drawings, in which.

DESCRIPTION OF THE INVENTION

Figure 1:
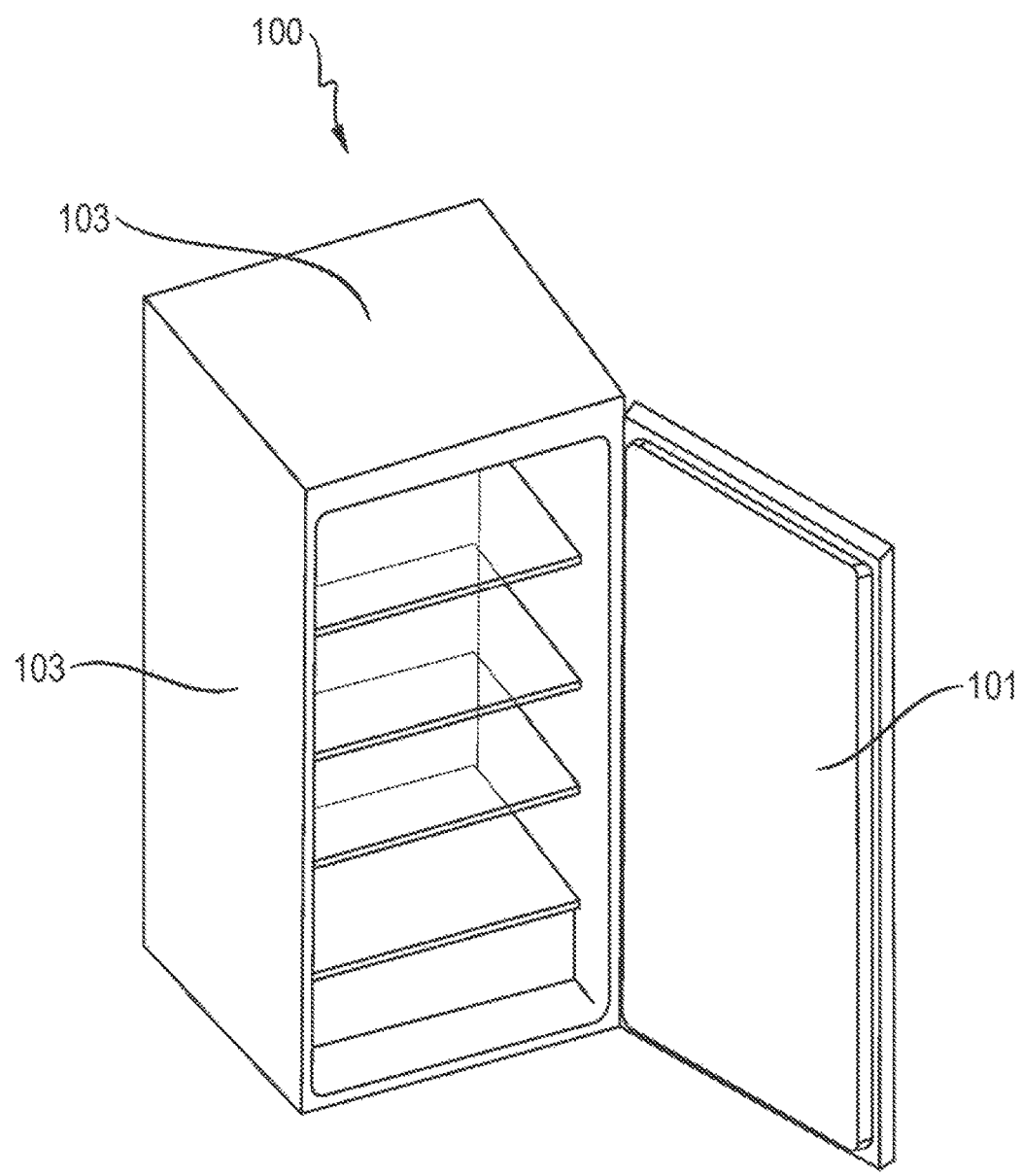
FIG. 1 shows a schematic diagram of a refrigeration appliance.

FIG. 1 shows a refrigerator, which represents a general refrigeration appliance 100 with a refrigeration appliance door 101, which can be used to close the inner chamber of the general refrigeration appliance 100, and with a frame 103.

The refrigeration appliance 100 comprises a refrigeration circuit with an evaporator 164, compressor 165, condenser 166 and throttle device 167. The evaporator is a heat exchanger, in which, after expanding, the liquid refrigerant is evaporated by absorbing heat from the medium to be cooled, e.g. air. The compressor is a mechanically operated part which takes in vaporized refrigerant from the evaporator and ejects it to the condenser at a higher pressure. The condenser is a heat exchanger, in which, after being compressed, the evaporated refrigerant is condensed by outputting heat to an external cooling medium, e.g. air. The throttle device is an apparatus for constantly reducing pressure by narrowing cross section. The refrigerant is a fluid used to transfer heat in the cold-generating system, which absorbs heat when the fluid is at low temperatures and low pressure and outputs heat when the fluid is at a higher temperature and higher pressure, with state changes of the fluid generally being included.

Figure 2:
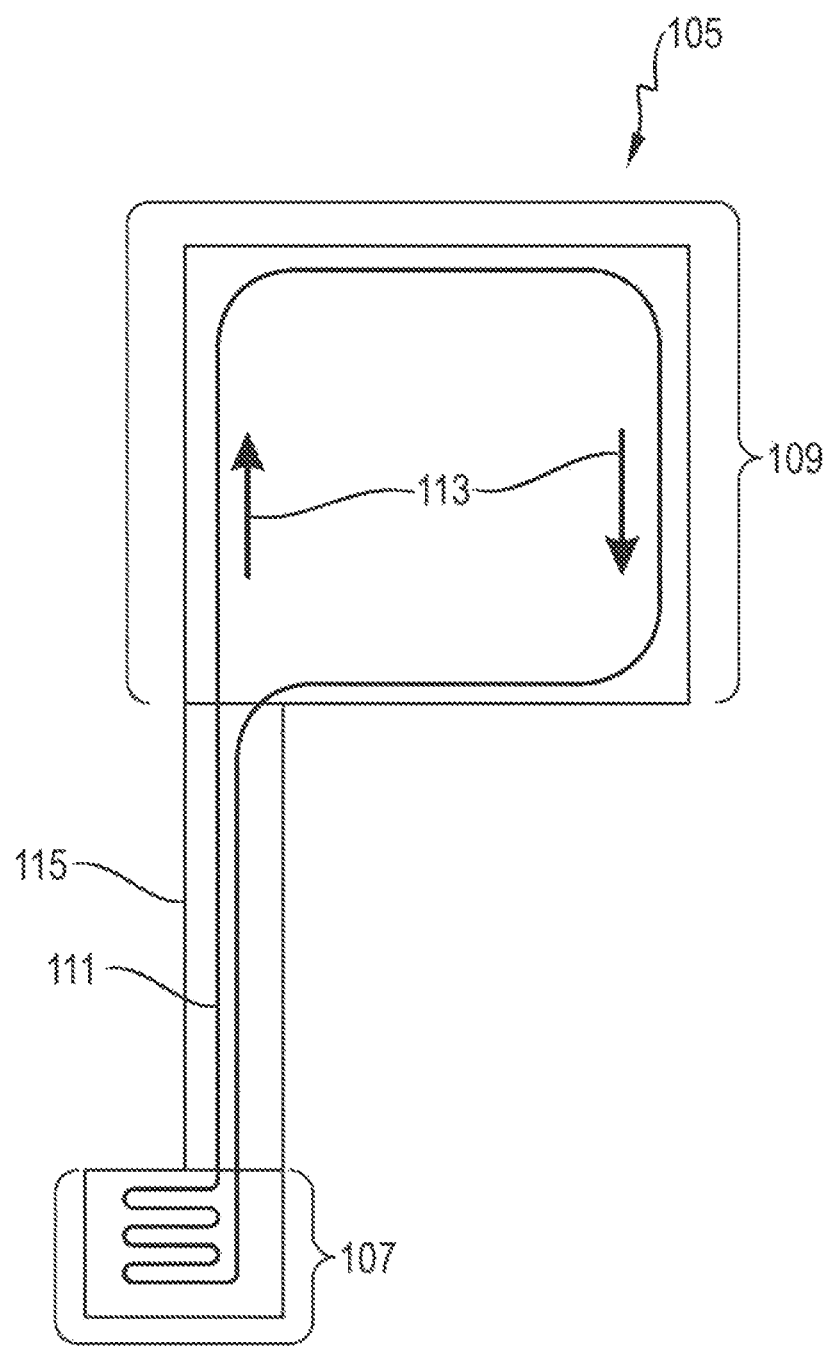
FIG. 2 shows a schematic diagram of a heat circulation system in a refrigeration appliance.

FIG. 2 shows a schematic diagram of a heat circulation system 105 with a heat transporting substance in a refrigeration appliance 100, the heat circulation system 105 comprising a heat conducting region 107 and a heat output region 109. Essential for the operation of the heat circulation system 105 is a temperature difference between the two regions of the heat circulation system 105, in order to allow heat to be transported by the heat transporting substance in the heat circulation system 105. As the temperature outside the heat conducting region 107 is greater than the temperature of the heat transporting substance in the refrigeration appliance 100, a quantity of heat is absorbed by the heat transporting substance in the heat conducting region 107. The heated heat transporting substance is transported through a substance line 111 to the heat output region 109 of the heat circulation system 105 in the flow direction 113. As the temperature outside the heat output region 109 is lower than the temperature of the heated heat transporting substance, the quantity of heat is output from the heat transporting substance in the heat output region 109 to a region outside the heat output region 109.

Between the heat conducting region 107 and the heat output region 109 the heat circulation system 105 comprises an insulating region 115 to prevent a flow of heat outside the heat circulation system 105 between the two regions with different temperatures in the refrigeration appliance 100.

If the heat circulation system 105 comprises a thermosiphon, the heat generated in the refrigeration appliance 100 during operation of the cooling circuit is output to the heat conducting region 107 of the heat circulation system 105 in order to heat the heat transporting substance, causing this to evaporate and the gas to rise upward in the substance line 111. In the heat output region 109 the heated heat transporting substance outputs the absorbed heat to the surroundings of the heat circulation system 105, causing it to be cooled and to condense. The cooled condensed heat transporting substance flows back down due to gravity and collects in the heat conducting region 107.

Figure 3:
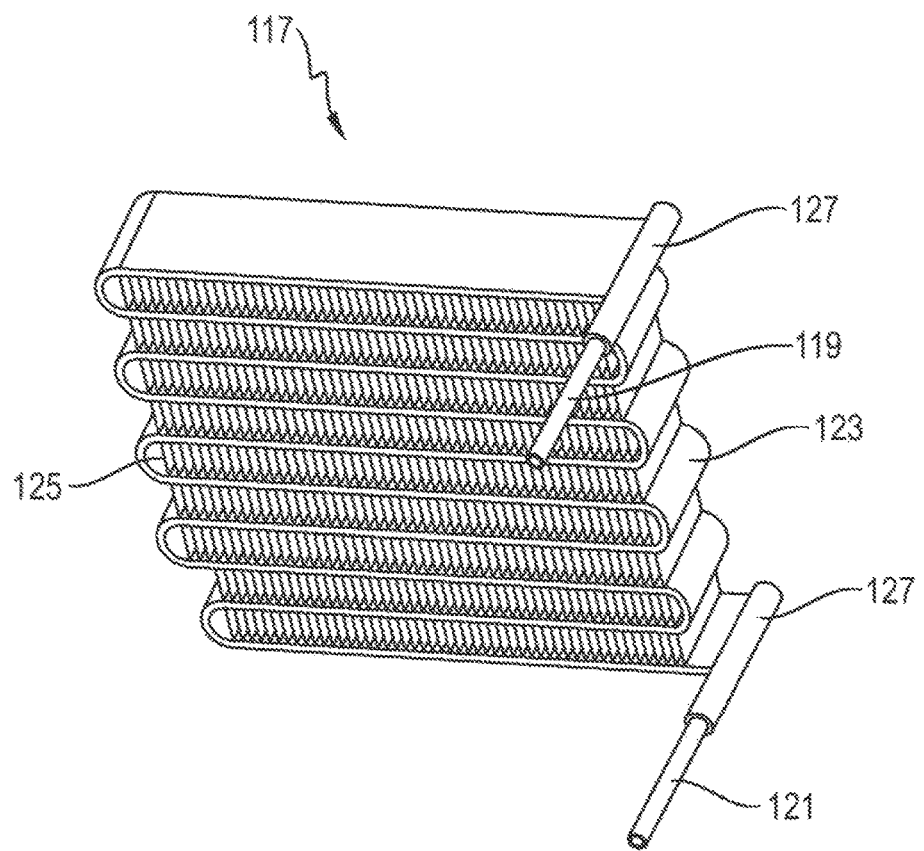
FIG. 3 shows schematic diagram of a condenser as an example for comparison.

FIG. 3 shows a schematic diagram of a condenser made of extruded MPE tube (MPE condenser) as an example for comparison. The condenser 117 comprises an entry tube 119 and an exit tube 121, through which the refrigerant in the refrigeration circuit can be conducted into and out of the condenser 117. The condenser 117 comprises an extruded MPE tube 123, through which refrigerant is conducted and which has a serpentine structure. Fins 125 are positioned between the serpentine segments of the MPE tube 123, allowing heat to be output efficiently by the condenser 117 to the surroundings.

The transition of the extruded MPE tube 123 to the entry tube 119 and to the exit tube 121 is brought about in each instance by a top unit 127. The top unit 127 has an opening on a front face, by means of which the entry tube 119 or exit tube 121 is connected to the top unit 127. A gap is located on the longitudinal face of the top unit 127, into which the MPE tube 123 can be inserted to bring about a reliable connection between the MPE tube 123 and the entry tube 119 or the exit tube 121.

Heated refrigerant can thus be conducted by way of the entry tube 119 through the extruded MPE tube 123 into the condenser 117 and by way of the exit tube 121 back out of the condenser 117. A quantity of heat can be output from the refrigerant to the outer region of the condenser 117 by the fins 125, in order to condense the refrigerant.

Figure 4:
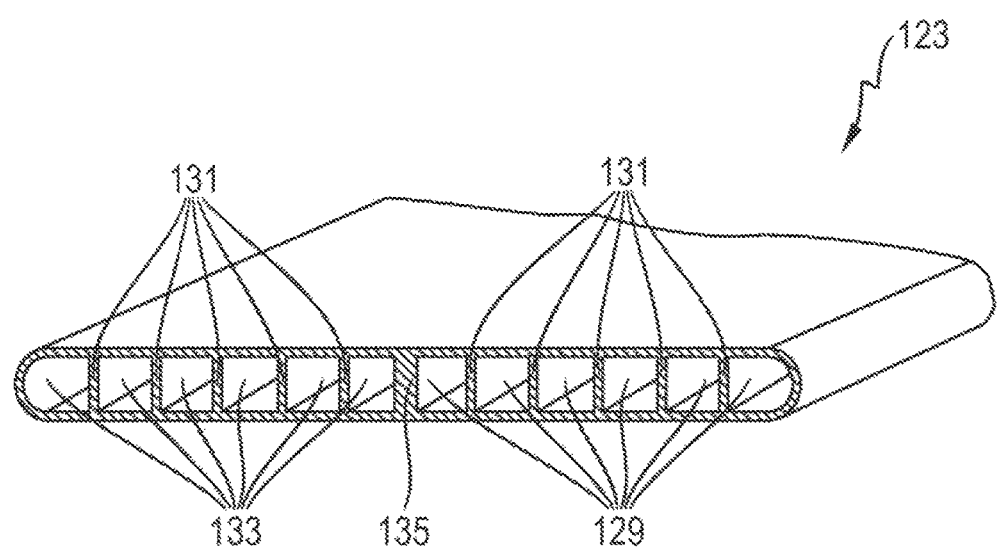
FIG. 4 shows a schematic diagram of an MPE tube.

FIG. 4 shows a schematic diagram of an MPE tube 123 according to the present invention. The MPE tube 123 can comprise an extruded tube of one or various metals and can be made of aluminum. The MPE tube 123 comprises a number of refrigeration ducts 129, through which the refrigerant from the refrigeration circuit can flow and which are separated from one another by webs 131. The webs 131 strengthen the MPE tube 123 and allow the MPE tube 123 to bend in a serpentine manner.

The MPE tube 123 also comprises a number of heat ducts 133, through which a heat transporting substance from a heat circulation system 105 can flow and which are also separated from one another by webs 131. A separating wall 135 is present between the heat ducts 133 and the refrigeration ducts 129. The separating wall 135 prevents the refrigerant flowing through the refrigeration ducts 129 from mixing with the heat transporting substance flowing through the heat ducts 133. The separating wall 135 is embodied in such a manner that heat can flow from the refrigerant in the refrigeration ducts 129 through the separating wall 135 to the heat transporting substance in the heat ducts 133.

Figure 5:
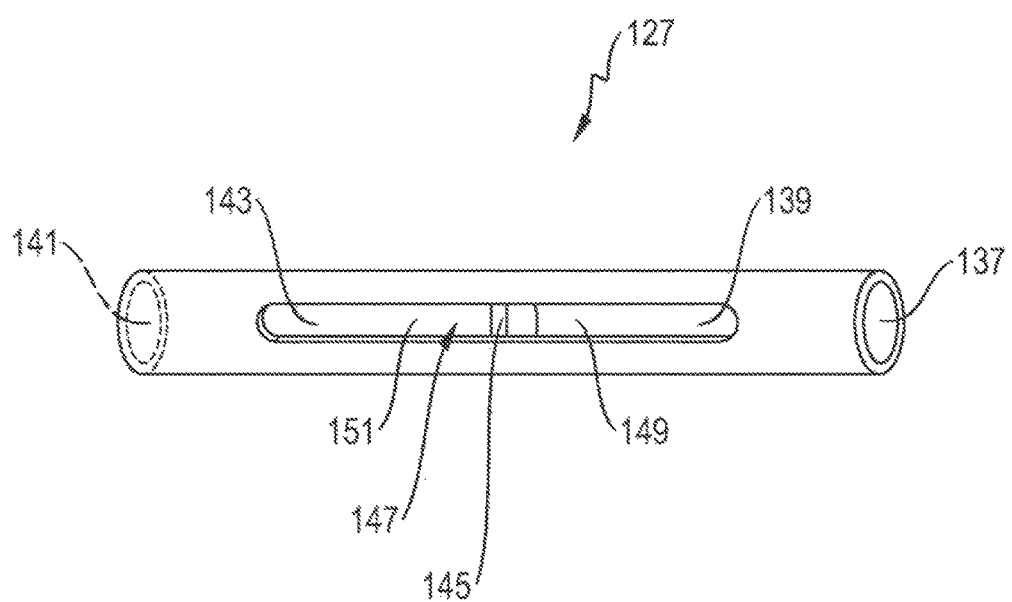
FIG. 5 shows a schematic diagram of a top unit.

FIG. 5 shows a schematic diagram of a top unit 127 according to the present invention. The top unit 127 can comprise an extruded tube of one or various metals and can be made of aluminum. The top unit 127 has a first opening 137 on a front face, by means of which an entry tube 119 or an exit tube 121 of the refrigeration circuit is connected to the top unit 127. Refrigerant from the refrigeration circuit can flow into a refrigerant chamber 139 of the top unit 127 through the opening 137.

In order to combine a part of the MPE tube 123 with a heat circulation system 105, the top unit 127 has a second opening 141 on the other front face, by means of which an entry tube 119 or exit tube 121 of the heat circulation system 105 is connected to the top unit 127. Heat transporting substance from the heat circulation system 105 can flow into a substance chamber 143 of the top unit 127 through the second opening 141.

In order to prevent refrigerant in the refrigerant chamber 139 and heat transporting substance in the substance chamber 143 of the top unit 127 from mixing, a center web 145 is positioned between the refrigerant chamber 139 and the substance chamber 143. The center web 145 allows a physical separation between substance chamber 143 and refrigerant chamber 139. However the center web 145 is embodied in such a manner that heat can flow from the refrigerant in the refrigerant chamber 139 to the heat transporting substance in the substance chamber 143 through the center web 145.

So that the top unit 127 can be connected reliably to the MPE tube 123, the top unit 127 has a slot 147 on a longitudinal face, said slot 147 being configured so as to hold the MPE tube 123. The slot 147 comprises a refrigerant slot 149, by means of which the refrigerant chamber 139 of the top unit 127 is reliably connected to the refrigeration ducts 129 of the MPE tube 123, in order to allow a flow of refrigerant by way of the first opening 137 through the refrigerant chamber 139 to the refrigeration ducts 129 of the MPE tube 123. The slot 147 also comprises a substance slot 151, by means of which the substance chamber 143 of the top unit 127 is reliably connected to the heat ducts 133 of the MPE tube 123, in order to allow a flow of heat transporting substance by way of the second opening 141 through the substance chamber 143 to the heat ducts 133 of the MPE tube 123.

Figure 6:
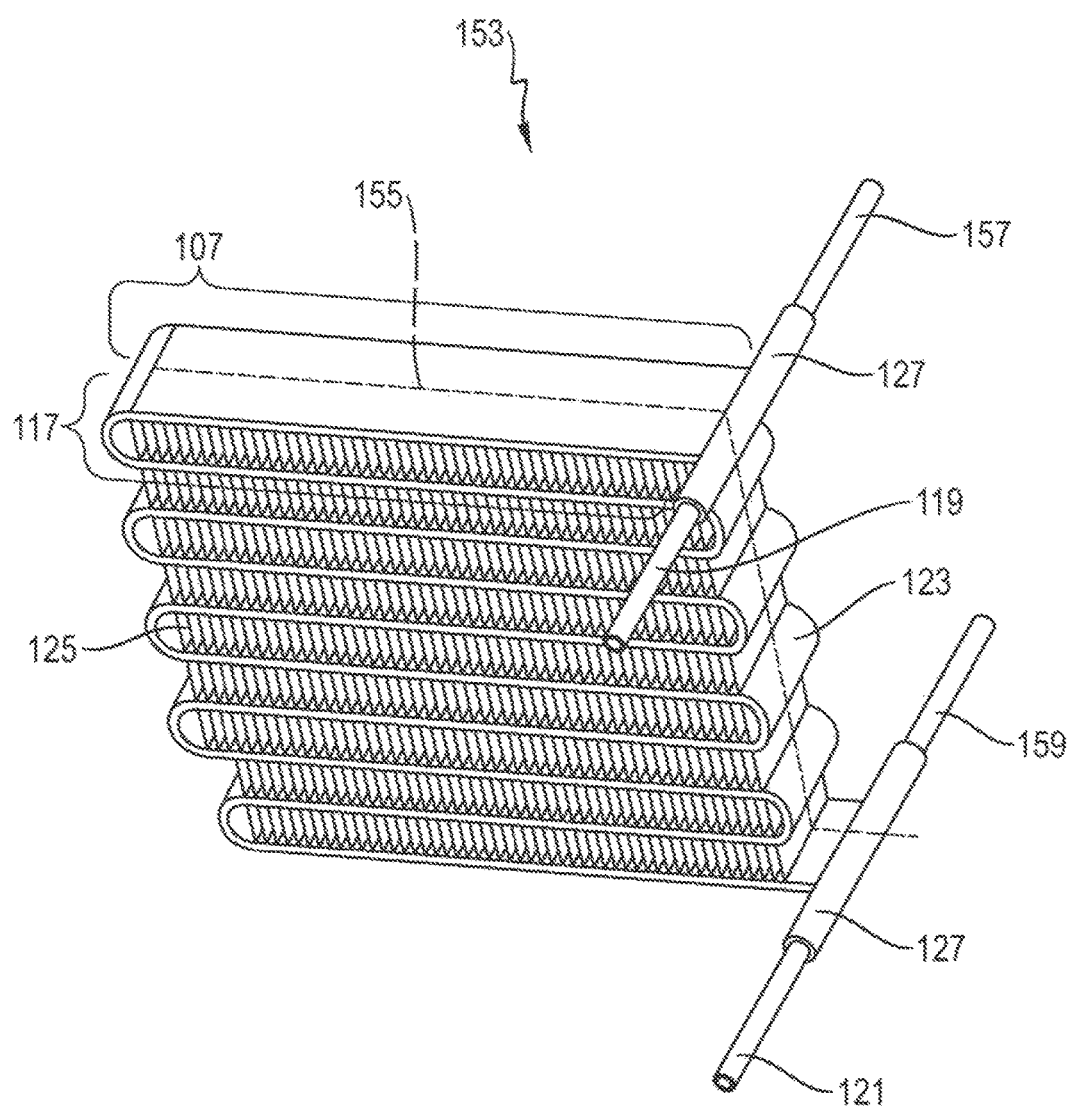
FIG. 6 shows a schematic diagram of a heat exchanging element.

FIG. 6 shows a schematic diagram of a heat exchanging element according to the present invention with an MPE tube according to FIG. 4 and a top unit according to FIG. 5. The heat exchanging element 153 comprises a condenser 117 and a heat conducting region 107, which are separated by the separating wall 135 and center web 145, as shown by a dividing line 155. The condenser 117 comprises an entry tube 119 and an exit tube 121, through which refrigerant can be conducted into and out of the condenser 117. The condenser 117 and the heat conducting region 107 comprise an extruded MPE tube 123, through which refrigerant or heat transporting substance is conducted and which has a serpentine structure. Fins 125 are positioned between the serpentine segments of the extruded MPE tube 123.

The transition of the extruded MPE tube 123 to the entry tube 119 and to the exit tube 121 is brought about in each instance by a top unit 127. The top unit 127 has a first opening 137 on a front face, by means of which the entry tube 119 or exit tube 121 is connected to the top unit 127. A slot 147 is located on the longitudinal face of the top unit 127, into which the MPE tube 123 can be inserted to bring about a reliable connection between the MPE tube 123 and the entry tube 119 or the exit tube 121.

The top unit 127 further comprises a second opening 141, into which a further entry tube 157 and into which a further exit tube 159 can be inserted. The further entry tube 157 and the further exit tube 159 are connected to the heat circulation system 105, so that the heat transporting substance can be conducted through the heat conducting region 107.

Because of the separating wall 135 in the MPE tube 123 and the center web 145 in the top unit 127 the refrigerant flowing through the refrigeration ducts 129 is prevented from mixing with the heat transporting substance flowing through the heat ducts 133 so the dividing line 155 ensures that the heat exchanging element 153 is divided into two. The condenser 117 of the heat exchanging element 153 separated by the dividing line 155 is part of an active refrigeration circuit with a compressor, while the heat conducting region 107 of the heat exchanging element 153 separated by the dividing line 155 is part of a passive heat circulation system 105, for example a thermosiphon or heating pipe.

The separating wall 135 and the center web 145 are however configured in such a manner that they are thermally conducting and heat can therefore flow from the refrigerant in the refrigeration ducts 129 to the heat transporting substance in the heat ducts 133. The heat exchanging element 153 therefore functions as a heat exchanger, to transfer heat from the refrigeration circuit to the heat circulation system 105.

The heat circulation system 105 can output the heat dissipated from the refrigeration circuit by the condenser 117 to an element of the refrigeration appliance 100. For example the dissipated heat can be output to a surface region of the frame 103 of the refrigeration appliance 100 in order to heat the surface region of the frame 103 and prevent water condensing on a cold surface of the frame 103.

Figure 7:
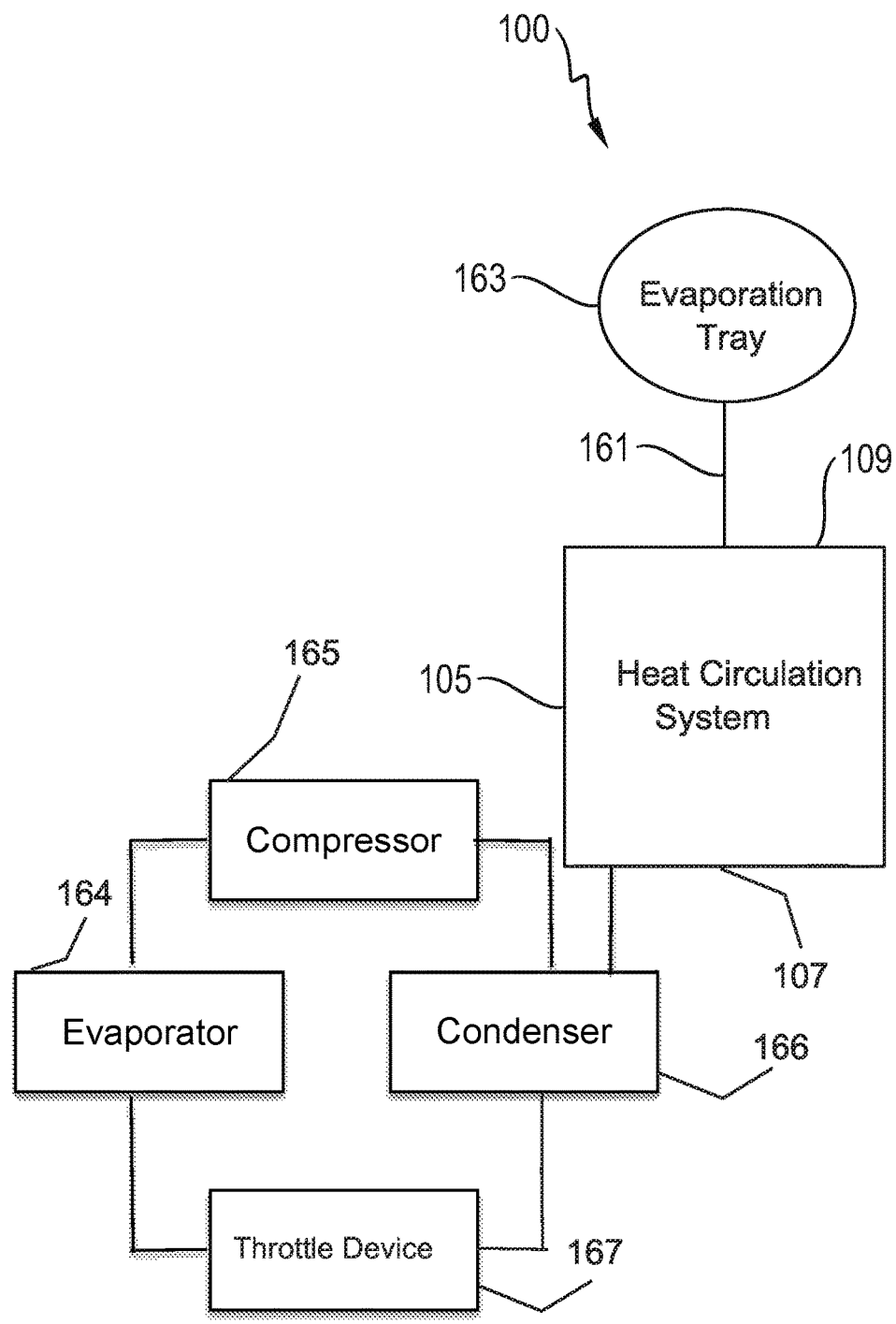
FIG. 7 shows a schematic diagram of a refrigeration appliance with an evaporation tray.

FIG. 7 shows a schematic diagram of a refrigeration appliance 100 with an evaporation tray 163. The refrigeration appliance 100 comprises a heat circulation system 105, with a heat conducting region 107 for absorbing heat and a heat output region 109 for outputting heat to a thermally conducting element 161, for example an element with a large surface, which is configured to output the output heat to the evaporation tray 163. This ensures that heat is transferred efficiently from the heat conducting region 107 to the evaporation tray 163 of the refrigeration appliance 100.

The heat circulation system 105 can comprise a heating pipe as well as a thermosiphon to output heat to the evaporation tray 163. A heating pipe is a closed pipe, which is filled with a heat transporting substance and which has a wick on the outer wall of the heating pipe. The heat transporting substance is in a liquid aggregate state in the wick. When the heat conducting region 107 of the heating pipe is heated, the heat transporting substance absorbs heat and evaporates and the resulting pressure increase in the heating pipe causes gaseous heat transporting substance to output heat and condense at the same time in the heat output region 109 of the heating pipe. The heating pipe therefore causes heat to be transported efficiently from a warm to a cold environment, which is much more efficient than the conventional conducting of heat in copper.

As the heat circulation system 105, e.g. the heating pipe, dissipates heat from the condenser 117 and is therefore colder than its surroundings, the condenser 117 is cooled more efficiently than by air cooling. The lower the condensation temperature of the refrigerant in the refrigeration circuit, the greater the efficiency of the compressor in the refrigeration circuit and the lower the energy consumption of the refrigeration appliance 100 as a whole. The more efficient cooling of the condenser 117 by the heat circulation system 105 can in some instances result in a fan in the refrigeration appliance 100 operating more slowly, thereby reducing noise levels during operation of the refrigeration appliance 100.

All the features described and illustrated in conjunction with individual embodiments of the invention can be provided in different combinations in the inventive subject matter, in order to bring about their advantageous effects at the same time.

The scope of protection of the present invention is defined by the claims and is not restricted by the features set out in the description or illustrated in the figures.

LIST OF REFERENCE CHARACTERS

100 Refrigeration appliance
101 Refrigeration appliance door
103 Frame
105 Heat circulation system
107 Heat conducting region
109 Heat output region
111 Substance line
113 Flow direction
115 Insulating region
117 Condenser
119 Entry tube
121 Exit tube
123 MPE tube
125 Fins
127 Top unit
129 Refrigeration ducts
131 Web
133 Heat ducts
135 Separating wall
137 First opening
139 Refrigerant chamber
141 Second opening
143 Substance chamber
145 Center web
147 Slot
149 Refrigerant slot
151 Substance slot
153 Heat exchanging element
155 Dividing line
157 Further entry tube
159 Further exit tube
161 Thermally conducting element
163 Evaporation tray

The invention claimed is:

1. A refrigeration appliance, comprising:
   a refrigeration circuit including a condenser and a refrigerant;
   an element being a region or a part of the refrigeration appliance not being actively cooled by said refrigeration circuit;
   a heat circulation system for heating said element of the refrigeration appliance, said heat circulation system including a heat conducting region and a heat transporting substance; and
   a heat exchanging element including said condenser, said heat conducting region and a top unit configured to connect said heat exchanging element to said refrigeration circuit and to said heat circulation system;
   said top unit including a refrigerant chamber for receiving the refrigerant through a first opening, a substance chamber for receiving the heat transporting substance through a second opening and a thermally conducting center web separating said refrigerant chamber and said substance chamber from one another;
   said condenser and said heat conducting region in said heat exchanging element being thermally coupled to output heat from said refrigeration circuit to said heat conducting region of said heat circulation system.

2. The refrigeration appliance according to claim 1, wherein said condenser of said heat exchanging element is made of a multiport extruded tube.

3. The refrigeration appliance according to claim 1, wherein:
   said condenser includes a refrigeration duct;
   said heat conducting region includes a heat duct;
   said refrigeration duct is configured to convey the refrigerant from said refrigeration circuit into said heat exchanging element; and
   said heat duct is configured to convey the heat transporting substance from said heat circulation system into said heat exchanging element.

4. The refrigeration appliance according to claim 3, wherein said refrigeration duct and said heat duct are mutually parallel and are configured to convey the refrigerant in said refrigeration duct and the heat transporting substance in said heat duct in opposing flow directions through said refrigeration duct and through said heat duct.

5. The refrigeration appliance according to claim 3, which further comprises a thermally conducting separating wall separating said refrigeration duct from said heat duct.

6. The refrigeration appliance according to claim 1, wherein the heat transporting substance includes an alkane, a fluorinated hydrocarbon or water.

7. The refrigeration appliance according to claim 1, wherein the heat transporting substance includes isobutane, tetrafluoroethane or water.

8. The refrigeration appliance according to claim 1, wherein the heat transporting substance includes water.

9. The refrigeration appliance according to claim 1, wherein:
said heat circulation system includes a heat output region;
said heat conducting region is configured to output a quantity of heat absorbed by said condenser of said heat exchanging element to the heat transporting substance in said heat circulation system in order to heat the heat transporting substance;
said heat circulation system is configured to conduct the heated heat transporting substance from said heat conducting region to said heat output region; and
said heat output region is configured to output a quantity of heat absorbed by the heat transporting substance to said element of the refrigeration appliance.

10. The refrigeration appliance according to claim 9, which further comprises a frame of the refrigeration appliance, said heat circulation system being configured to output the absorbed quantity of heat to said frame of the refrigeration appliance.

11. The refrigeration appliance according to claim 10, wherein said frame of the refrigeration appliance has a surface region, and said heat circulation system is configured to output the absorbed quantity of heat to said surface region of said frame of the refrigeration appliance.

12. The refrigeration appliance according to claim 1, wherein said refrigeration circuit includes an active system with an evaporator, a compressor or a throttle device.

13. The refrigeration appliance according to claim 1, wherein said heat circulation system includes a passive system with a thermosiphon or a heating pipe.

14. The refrigeration appliance according to claim 1, which further comprises an evaporation tray, said heat circulation system being configured to output an absorbed quantity of heat to said evaporation tray.

15. The refrigeration appliance according to claim 14, wherein said heat circulation system includes a heat output region, and said heat output region includes a thermally conducting element being in thermal contact with said evaporation tray to ensure efficient heating of said evaporation tray.

* * * * *